United States Patent [19]

Iizuka

[11] Patent Number: 5,233,889
[45] Date of Patent: Aug. 10, 1993

[54] CONTROL SYSTEM FOR AUTOMOTIVE AUTOMATIC TRANSMISSION

[75] Inventor: Naonori Iizuka, Shizuoka, Japan
[73] Assignee: Jatco Corporation, Fuji, Japan
[21] Appl. No.: 878,469
[22] Filed: May 5, 1992
[30] Foreign Application Priority Data May 20, 1991 [JP] Japan ................................. 3-143837

[51] Int. Cl.⁵ .............................................. B60K 41/06
[52] U.S. Cl. ...................................... 74/866; 74/844; 74/858; 74/874; 364/424.1
[58] Field of Search ................ 74/857, 858, 844, 872, 74/874, 866; 364/424.1

[56] References Cited

U.S. PATENT DOCUMENTS

| 4,716,788 | 1/1988 | Kita ....................................... 74/858 |
| 4,972,737 | 11/1990 | Makimoto .......................... 74/872 X |
| 5,086,666 | 2/1992 | Moriki .......................... 364/424.1 X |

FOREIGN PATENT DOCUMENTS

| 59-62756 | 4/1984 | Japan . | |
| 63-251652 | 10/1988 | Japan . | |
| 2-138565 | 5/1990 | Japan .................................... | 74/874 |
| 1546301 | 2/1990 | U.S.S.R. ............................... | 74/858 |
| 2151727 | 7/1985 | United Kingdom .................. | 74/858 |

Primary Examiner—Richard M. Lorence
Assistant Examiner—Benjamin Levi
Attorney, Agent, or Firm—Foley & Lardner

[57] ABSTRACT

An existing maximum engine speed during the upshift of a transmission at the time when the engine load is higher than a predetermined level is detected. The existing maximum engine speed is compared with a reference maximum engine speed to correct an engine speed based upshift characteristic line.

5 Claims, 6 Drawing Sheets

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ○ | | | | ○ | ○ | $\dfrac{1+\alpha_2}{\alpha_2}$ | 3.027 |
| | 2ND. SPEED | | ○ | ○ | | ○ | | ○ | | $\dfrac{\alpha_1+\alpha_2+\alpha_1\cdot\alpha_2}{\alpha_2(1+\alpha_1)}$ | 1.619 |
| | 3RD. SPEED | ○ | | ○ | ○ | | | ○ | | 1 | 1.000 |
| | 4TH. SPEED | ○ | | (○) | ○ | ○ | | | | $\dfrac{1}{1+\alpha_1}$ | 0.694 |
| ENGINE BRAKE RUNNING STATE | 1ST. SPEED | | ○ | (○) | ○ | ○ | ○ | (○) | (○) | | |
| | 2ND. SPEED | | ○ | (○) | ○ | ○ | | (○) | | | |
| | 3RD. SPEED | ○ | | (○) | ○ | ○ | | (○) | | | |
| | 4TH. SPEED | ○ | | (○) | | ○ | | | | | |
| REVERSE | | ○ | | | | | ○ | | | $-\dfrac{1}{\alpha_1}$ | -2.272 |

CONTROL SYSTEM FOR AUTOMOTIVE AUTOMATIC TRANSMISSION

BACKGROUND OF THE INVENTION

1. Field of the Invention

The present invention relates in general to automatic transmissions, and more particularly, to control systems for controlling the automotive automatic transmissions.

2. Description of the Prior art

In order to clarify the task of the present invention, one conventional control system for an automotive automatic transmission will be outlined, which is shown in Japanese Patent First Provisional Publication 59-62756.

The control system shown by the publication is so constructed as to judge the need for upshifting the transmission by analyzing information signals from an engine speed sensor and an engine load sensor. Upon judging the need, an electromagnetic means is operated to hydraulically control a gear change actuator to execute the upshift.

In the known control system, however, it sometimes occurs that, particularly in a higher engine load range, the upshift is not effectively made due to insufficiency in power performance of an associated engine.

That is, usually, in the higher engine load range, the gear change timing is set so as to achieve the upshift at a relatively low engine speed considering a considerable dispersion in engine speed during the gear change. As is known, the maximum engine speed during the gear change is forced to vary depending on dispersions in engine output torque, gear change hydraulic pressure and friction coefficients of various friction elements (viz., brakes, clutches and the like). In view of the unavoidable change in the maximum engine speed, the gear change timing for the upshift is set at such relatively low engine speed to prevent the engine speed from exceeding an allowable maximum speed.

Accordingly, even in case wherein a sufficient driving force is really needed at a higher speed range of the engine and a lower gear speed of the transmission, the upshift is forced to take plate at relatively early stage, which causes the transmission to fail to effectively use the engine performance.

SUMMARY OF THE INVENTION

It is therefore an object of the present invention to provide a control system for an automotive automatic transmission, which system is free of the above-mentioned drawback.

According to a first aspect of the present invention, there is provided a control system for controlling an automatic transmission on a motor vehicle powered by an engine. The control system comprises an engine speed sensor for sensing a rotation speed of the engine; an engine load sensor for sensing a load of the engine; a first means for judging the necessity of upshift of the transmission by analyzing information signals from the engine speed sensor and the engine load sensor with reference to an engine speed based upshift characteristic line which has been provided by a vehicle speed and an engine load; a second means for detecting an existing maximum engine speed during the upshift operation in case wherein the first means judges the necessity of the upshift; a third means for comparing the existing maximum engine speed thus detected by the second means with a reference maximum engine speed which is provided by the engine load thus detected by the engine load sensor; and a fourth means for shifting the upshift characteristic line toward a higher engine speed side when the existing maximum engine speed is lower than the reference maximum engine speed, and shifting the upshift characteristic line toward a lower engine speed side when the existing maximum engine speed is higher than the reference maximum engine speed.

According to a second aspect of the present invention, there is provided a control system for controlling an automatic transmission on a motor vehicle powered by an engine. The control system comprises first means for issuing information signals representative of a throttle valve opening degree of the engine, a rotation speed of the engine, a speed of the vehicle, a temperature of hydraulic operating fluid of the transmission and a gear speed which the transmission assumes; second means for preparing a reference engine speed by analyzing the information signals issued from the first means with reference to an engine speed based upshift characteristic line which is memorized; third means for issuing an upshift instruction when the existing engine speed is higher than the reference engine speed; fourth means for deriving a reference maximum engine speed from a memorized reference map when the existing throttle valve opening degree is greater than a memorized reference degree; and fifth means for shifting the upshift characteristic line toward a higher engine speed side when the existing maximum engine speed is lower than the reference maximum engine speed, and shifting the upshift characteristic line toward a lower engine speed side when the existing maximum engine speed is higher than the reference maximum engine speed.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to the drawings, there is shown an embodiment of the present invention.

Figure 1:
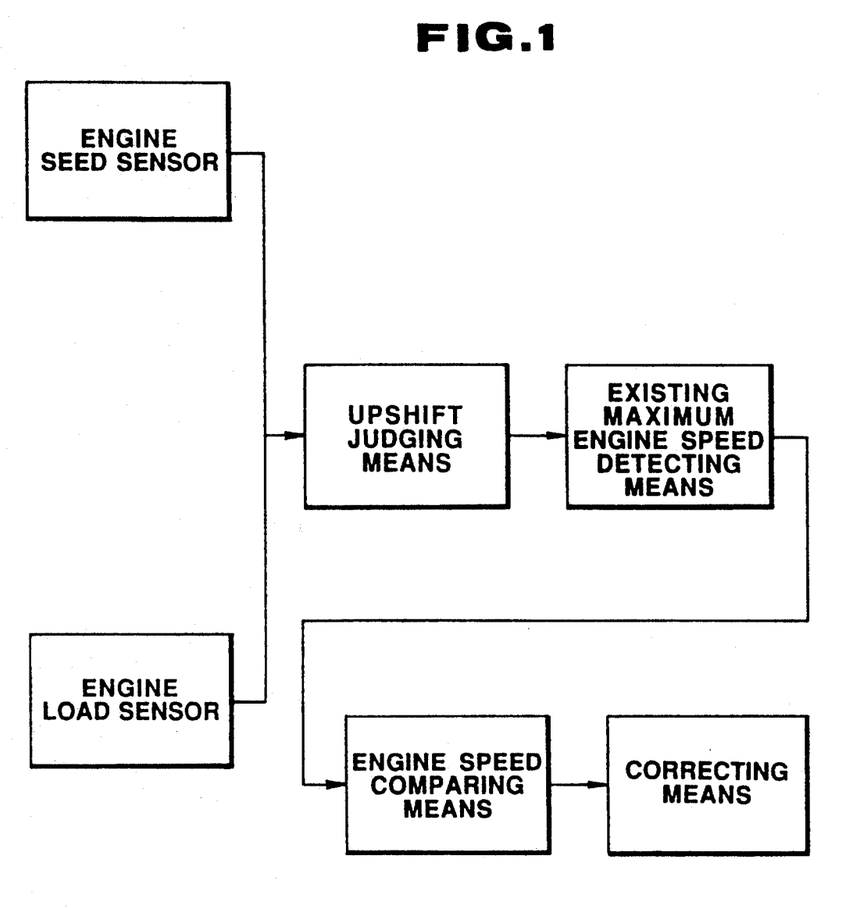
FIG. 1 is a block diagram showing the concept of the present invention.

FIG. 1 provides an overview block diagram of an embodiment of the present invention. As seen in FIG. 1, the present control system includes an engine speed sensor for sensing a rotation speed of the engine, and an engine load sensor for sensing a load of the engine. Input from both sensors is used in the upshift judging means which analyzes information signals from the engine speed sensor and the engine load sensor with reference to an engine speed based upshift characteristic line. The existing maximum engine speed is then detected and compared with a reference maximum engine speed and the correcting means then corrects the engine speed based upshift characteristic line. The remaining figures will describe this embodiment of the present invention in greater detail.

Figure 2:
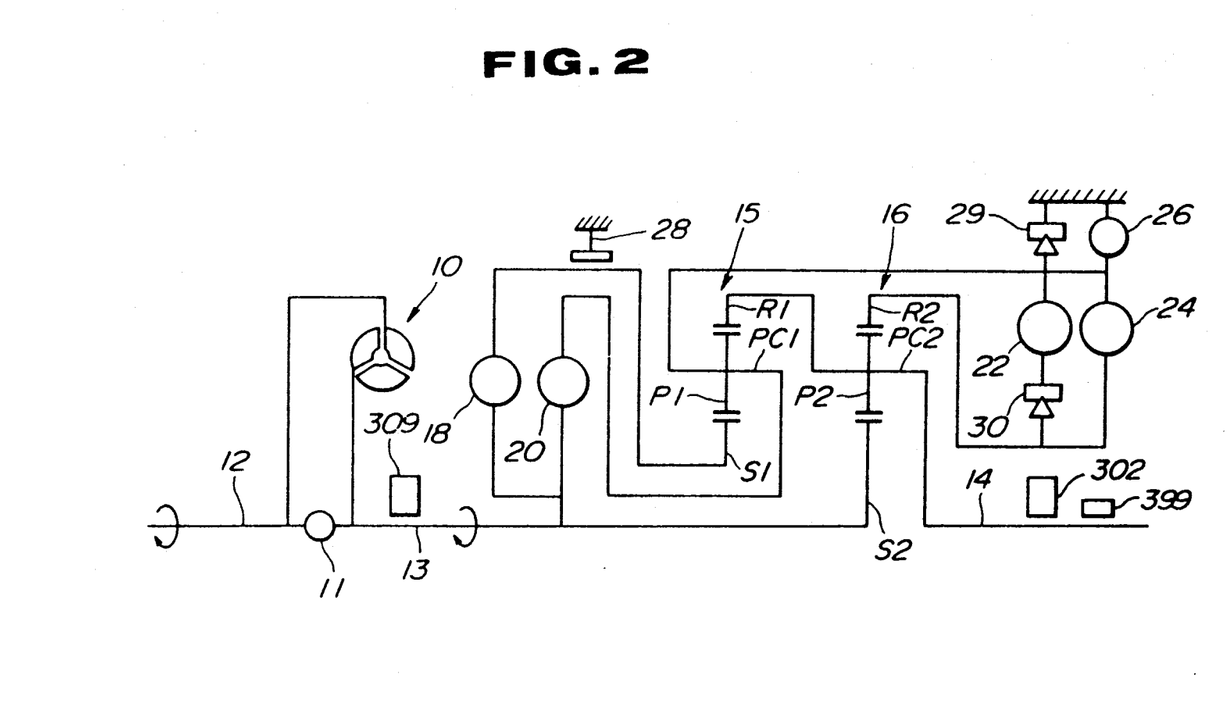
FIG. 2 is a schematic illustration of an automotive automatic transmission to which the present invention is applied.

In FIG. 2, there is schematically shown an automotive automatic transmission of a type having four forward speeds (one being an overdrive) and one reverse.

The transmission comprises an input shaft 13 to which a torque of an engine output shaft 12 is transmitted through a torque converter 10.

Designated by numeral 14 is an output shaft of the transmission through which a driving force is fed to a final drive device (not shown). Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-one-way clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear R2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

Figure 3:
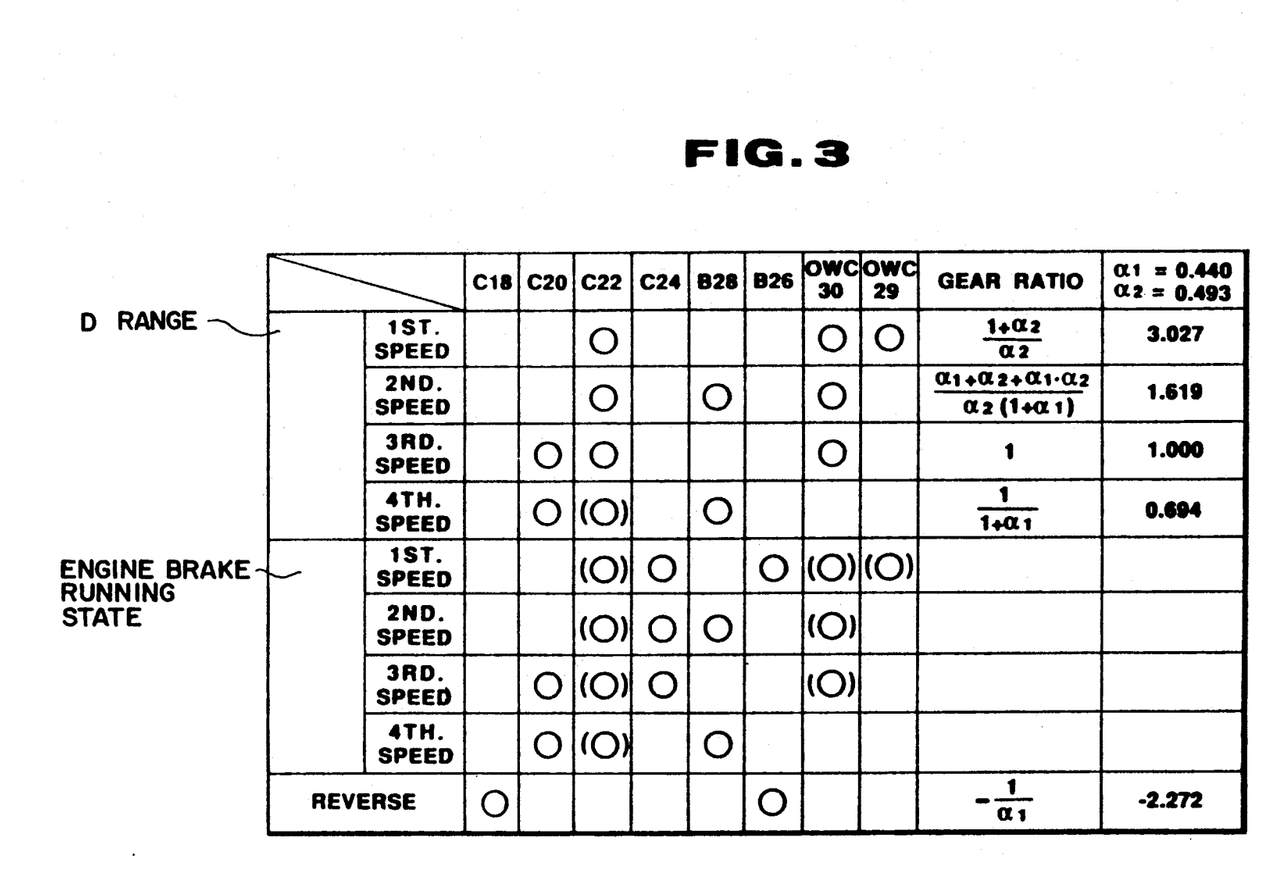
FIG. 3 is a TABLE showing ON/OFF conditions of various friction elements of the automatic transmission with respect to gear speeds selected.

FIG. 3 is a table showing the various gear speeds (viz., first, second, third and fourth forward speeds and a reverse) which are given by the ON/OFF conditions of the clutches 18, 20, 22, 24, 29 and 30 and the brakes 26 and 28.

In the table, the mark "O" means "ON" or engaged condition of the associated clutch or brake and "blank" means "OFF" or disengaged condition of the same. The mark "(O)" means engaged condition of an associated clutch or brake. However, this engaged condition does not participate in power transmission in the established gear speed. It is to be noted "$\alpha 1$" or "$\alpha 2$" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 4:
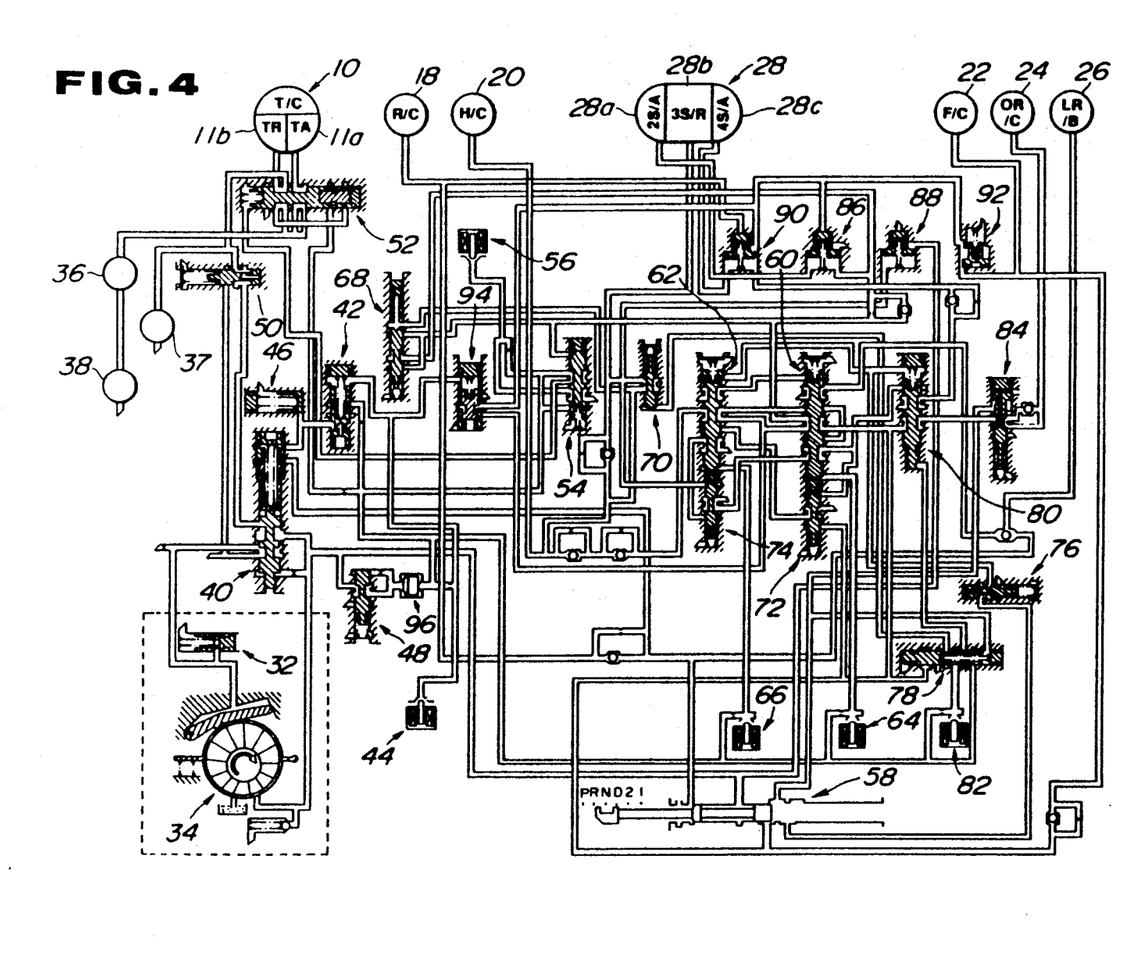
FIG. 4 is a hydraulic circuit of the automatic transmission.

FIG. 4 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 5:
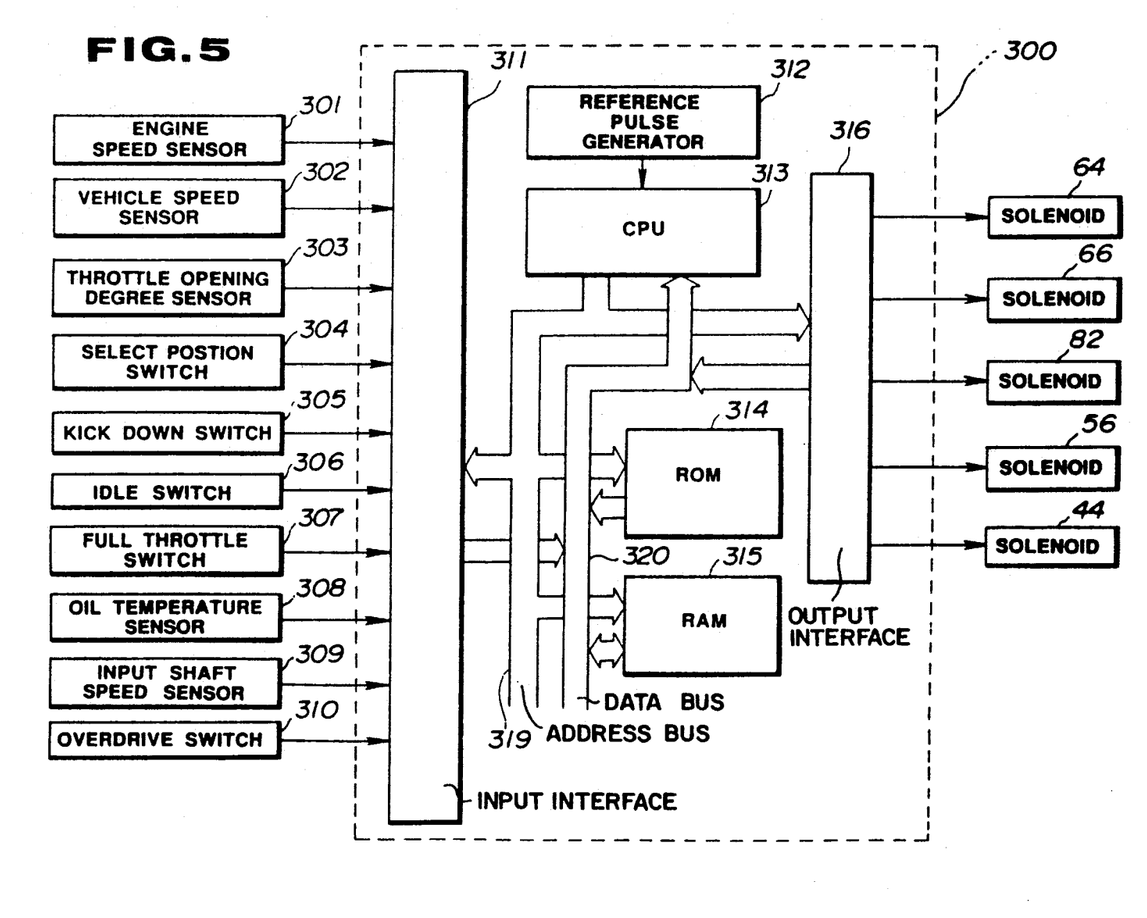
FIG. 5 is a schematic view of a control unit for controlling the transmission.

FIG. 5 shows schematically a control unit 300 which controls the operation of the solenoids 44, 56, 64, 66 and 82.

As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302, a throttle valve opening degree sensor 303, a select position switch 304, a kick down switch 305, an idle switch 306, a full throttle switch 307, an oil temperature switch 308, an input shaft speed sensor 309 and an over-drive switch 310 are fed to the input interface 311 of the control unit 300.

Instruction signals from the output interface 316 of the control unit 300 are fed to the first shift solenoid 64, the second shift solenoid 66, the overrunning clutch solenoid 82, the lock-up control solenoid 56 and the line pressure control solenoid 44.

In case wherein the throttle valve is largely open, the judging as to whether an upshift should be carried out or not is made based on both the throttle opening degree and the engine speed.

Figure 6:
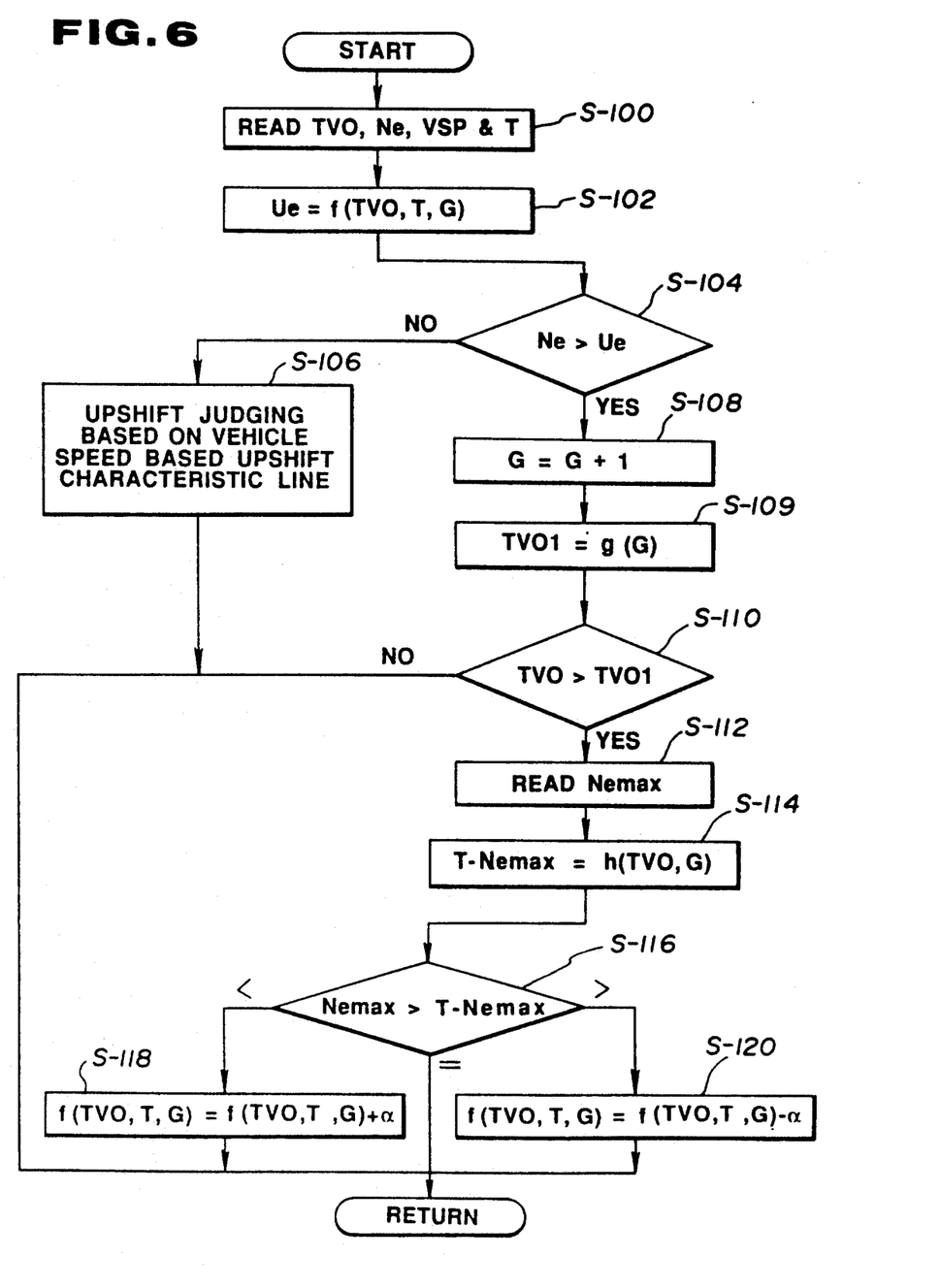
FIG. 6 is a flowchart showing operation steps carried out in a computer of the control unit.

The learning control for the upshift is carried out in such a manner as is depicted by the flowchart of FIG. 6.

That is, at step 100, the existing throttle valve opening degree (TVO), the existing engine speed (Ne), the existing vehicle speed (VSP) and the existing temperature (T) of the transmission oil are read, and at step 102, a reference engine speed (Ue) is looked up from a memorized engine speed based upshift characteristic line which has been provided by the throttle valve opening (TVO), the transmission oil temperature (T) and the gear speed (G). Then, at step 104, a judgement is carried out as to whether the existing engine speed (Ne) is higher than the reference engine speed (Ue) or not.

If NO, that is, when the existing engine speed (Ne) is lower than the reference engine speed (Ue), the operation flow goes to step 106 at which a judgement is carried out as to whether an upshift should be carried out or not from a vehicle speed based upshift characteristic line.

If YES at step 104, that is, when the existing engine speed (Ne) is higher than the reference engine speed (Ue), the operation flow goes to step 108 at which the calculation of "G=G+1" is carried out, that is, an upshift instruction is issued. At step 109, a reference throttle valve opening degree (TVO1) is looked up from a reference map which represents the relationship between the desired new gear speed and the throttle valve opening degree, and then at step 110, a judgment is carried out as to whether the existing throttle valve opening degree (TVO) is greater than the reference throttle valve opening degree (TVO1) or not.

If NO, that is, when the existing throttle valve opening degree (TVO) is smaller than the reference degree (TVO1), the operation flow goes to "Return".

If YES at step 110, that is, when the existing throttle valve opening degree (TVO) is greater than the reference degree (TVO1), the operation flow goes to step 112 at which the existing maximum engine speed (Nemax) during the gear change operation is read. Then, at step 114, a reference maximum engine speed (T-Nemax) is looked up from a map which represents the relationship between the throttle valve opening degree (TVO), the gear speed (G) and the engine speed (Ne). Then, at step 116, a judgement is carried out as to whether the existing maximum engine speed (Nemax) is higher than the reference maximum engine speed (T-Nemax) or not.

When the existing maximum engine speed (Nemax) is equal to the reference maximum speed (T-Nemax), the operation flow goes to "Return" directly.

If NO, that is, when the existing maximum engine speed (Nemax) is lower than the reference maximum speed (T-Nemax), the operation flow goes to step 118 at which a new engine speed based upshift characteristic line is provided. In the new engine speed based upshift characteristic line, the upshift characteristic line is shifted by a predetermined degree "α" toward a higher engine speed side.

If YES at step 116, that is, when the existing maximum engine speed (Nemax) is higher than the reference maximum speed (T-Nemax), the operation flow goes to step 120 at which another new engine speed based upshift characteristic line is produced. In this new line, the upshift characteristic line is shifted by the predetermined degree "α" toward a lower engine speed side.

The operations at steps 102 and 104 are those carried out by a so-called "upshift judging means", the operation at step 112 is that carried out by a so-called "sensor means for sensing the engine maximum speed during the speed change operation", the operations at steps 114 and 116 are those carried out by a so-called "engine speed comparing means" and the operations at steps 118 and 120 are those carried out by a so-called "correcting means".

As is seen from the above, in case wherein the existing throttle valve opening degree (TVO) is greater than the reference degree (TVO1), a correction of the engine speed based upshift characteristic line is carried out in a manner to bring the existing maximum engine speed (Nemax) during the gear change operation into agreement with the reference maximum engine speed (T-Nemax) during the gear change operation.

Accordingly, in the present invention, the maximum engine speed during the upshift is automatically brought into agreement with the desired maximum engine speed, so that the engine performance is effectively used without being affected by dispersions in engine output torque, gear change hydraulic pressure and friction coefficients of various friction elements.

What is claimed is:

1. A control system for controlling an automatic transmission on a motor vehicle powered by an engine, comprising:

an engine speed sensor means for sensing a rotation speed of said engine;

an engine load sensor means for sensing a load of said engine;

a first means for judging the necessity of upshift of the transmission by analyzing information signals from said engine speed sensor means and said engine load sensor means with reference to an engine speed based upshift characteristic line which has been provided by a vehicle speed and an engine load;

a second means for detecting an existing maximum engine speed during an upshift operation in case wherein said first means judges the necessity of the upshift;

a third means for comparing the existing maximum engine speed thus detected by said second means with a reference maximum engine speed which is provided by the engine load thus detected by said engine load sensor means; and a fourth means for shifting the upshift characteristic line toward a higher engine speed side when said existing maximum engine speed is lower than said reference maximum engine speed, and shifting the upshift characteristic line toward a lower engine speed side when said existing maximum engine speed is higher than said reference maximum engine speed.

2. A control system as claimed in claim 1, further comprising:

a fifth means for judging whether the load of said engine is smaller than a predetermined degree or not;

a sixth means for determining which occurs first between a first judgement which is carried out on the basis of said engine speed based upshift characteristic line and a second judgement which is carried out on the basis of a vehicle speed based upshift characteristic line which is provided by the vehicle speed and the engine load, and a seventh means for carrying out the upshift on the basis of the judgement on said vehicle speed based upshift characteristic line in case wherein said fifth means judges the engine load being smaller than the predetermined degree and said second judgement takes place first.

3. A control system as claimed in claim 1, in which said fourth means memorizes the engine speed based upshift characteristic line each time a gear change takes place.

4. A control system as claimed in claim 1, in which said engine speed based upshift characteristic line is corrected in accordance with the temperature of a hydraulic operating fluid of the transmission.

5. A control system for controlling an automatic transmission on a motor vehicle powered by an engine, comprising:

first means for issuing information signals representative of a throttle valve opening degree of the engine, a rotation speed of the engine, a speed of the vehicle, a temperature of hydraulic operating fluid of the transmission and a gear position which the transmission assumes;

second means for preparing a reference engine speed by analyzing the information signals issued from said first means with reference to an engine speed based upshift characteristic line which is memorized;

third means for issuing an upshift instruction when the existing engine speed is higher than said reference engine speed;

fourth means for deriving a reference maximum engine speed from a memorized map when the existing throttle valve opening degree is greater than a memorized reference degree; and fifth means for shifting the upshift characteristic line toward a higher engine speed side when said existing maximum engine speed is lower than said reference maximum engine speed, and shifting the upshift characteristic line toward a lower engine speed side when said existing maximum engine speed is higher than said reference maximum engine speed.

* * * * *